United States Patent [19]

Ellingson

[11] Patent Number: 4,483,082

[45] Date of Patent: Nov. 20, 1984

[54] SINGLE RELAY FOR MOTOR AND HEATER CONTROL

[75] Inventor: David I. Ellingson, Newton, Iowa

[73] Assignee: The Maytag Company, Newton, Iowa

[21] Appl. No.: 367,426

[22] Filed: Apr. 12, 1982

[51] Int. Cl.³ .............................................. F26B 21/10
[52] U.S. Cl. ............................................ 34/44; 34/48
[58] Field of Search .................... 34/45, 46, 48, 54, 44, 34/55

[56] References Cited

U.S. PATENT DOCUMENTS

| | | | |
|---|---|---|---|
| 3,944,841 | 3/1976 | Janke | 307/38 |
| 4,213,313 | 7/1980 | Kiefer et al. | 68/12 R |
| 4,275,508 | 6/1981 | Jones | 34/48 |

*Primary Examiner*—Larry I. Schwartz
*Attorney, Agent, or Firm*—Richard L. Ward

[57] ABSTRACT

A microprocessor controlled fabric drying apparatus is provided including structure having a rotatable fabric tumbler, a drive motor for driving the tumbler, and a heater for drying fabrics in the tumbler. A first circuit energizes the drive motor and includes a first relay switch and a centrifugal switch. The first circuit is operable for initiating energization of the drive motor in a first posture of the centrifugal switch and for maintaining rotation of the drive motor in a second posture thereof. A second circuit energizes the heater and includes a second relay switch. An interfacing circuit electrically interfaces the microprocessor with the drive motor and the heater through a single relay coil for operating the relay switches under control of the microprocessor. The first circuit includes a portion for maintaining energization of the drive motor during periods of deenergization of the heater and the microprocessor controls the heater without interrupting operation of the drive motor.

10 Claims, 2 Drawing Figures

SINGLE RELAY FOR MOTOR AND HEATER CONTROL

BACKGROUND OF THE INVENTION

This invention relates generally to the field of control circuitry for appliances and more particularly to the use of a single relay in combination with the centrifugal switch of the drive motor for controlling both the drive motor and the heater of a fabric drying machine.

It is well known in the field of microprocessor controlled appliances to utilize relay circuits for energizing various components which operate at different power levels than the microprocessor control. Typically, a separate relay is utilized to perform each function such as energizing dispensers, heaters etc. Since the relays are a relatively expensive portion of the interfacing between the microprocessor control and the various components it is readily apparent that any reduction in the number of relays is beneficial.

U.S. Pat. No. 3,944,841 discusses the use of relay circuitry having two coils and associated with switching apparatus to achieve four control states. Each of the coils is independently energizeable to control different switching combinations for controlling the three dryer loads.

U.S. Pat. No. 4,213,313 discloses relay circuitry which utilizes four relays in different combinations to provide eight operating functions. The disclosure of this patent reveals that a single pole, a double pole and two triple pole relays are used to provide the switching combinations required to achieve these eight functions.

Relay circuitry has thus been shown in the prior art whereby fewer relays are used than the number of functions controlled. There has been no known showing in the prior art of a single relay having a pair of single-pole single-throw switches which cooperate with the centrifugal switch of the drive motor to control energization of the drive motor and the heater or other components responsive to output signals from the microprocessor.

SUMMARY OF THE INVENTION

It is therefore an object of the instant invention to provide an improved control circuit for a microprocessor-based appliance control.

It is a further object of the instant invention to provide an improved relay interfacing circuit combined with the centrifugal switch of the drive motor.

Briefly, the instant invention achieves these objects in a microprocessor-based control for a fabric drying apparatus having structure including a rotatable fabric tumbler, a motor for driving the rotatable fabric tumbler and a heater to effect drying in the tumbler. The control includes a microprocessor for controlling operation of the fabric drying apparatus. A first circuit is provided for controlling the drive motor and includes a first relay switch and a centrifugal switch. The first circuit is operable for initiating energization of the drive motor in a first posture of the centrifugal switch and for maintaining rotation of the drive motor in a second posture thereof. A second circuit is provided for energizing the heater and includes a second relay switch. An interfacing circuit electrically interfaces the microprocessor with the drive motor and the heater. The interfacing circuit includes a single relay coil for operating the first and second relay switches under control of the microprocessor. The first circuit further includes a portion for maintaining energization of the drive motor during periods of deenergization of the single relay coil and the microprocessor is operable for controlling the heater without interrupting operation of the drive motor.

Operation of the control and further objects and advantages thereof will become evident as the description proceeds and from an examination of the accompanying two sheets of drawings.

BRIEF DESCRIPTION OF THE DRAWINGS

The drawings illustrate a preferred embodiment of the invention with similar numerals referring to similar parts throughout the several views, wherein.

DESCRIPTION OF A PREFERRED EMBODIMENT

Figure 1:
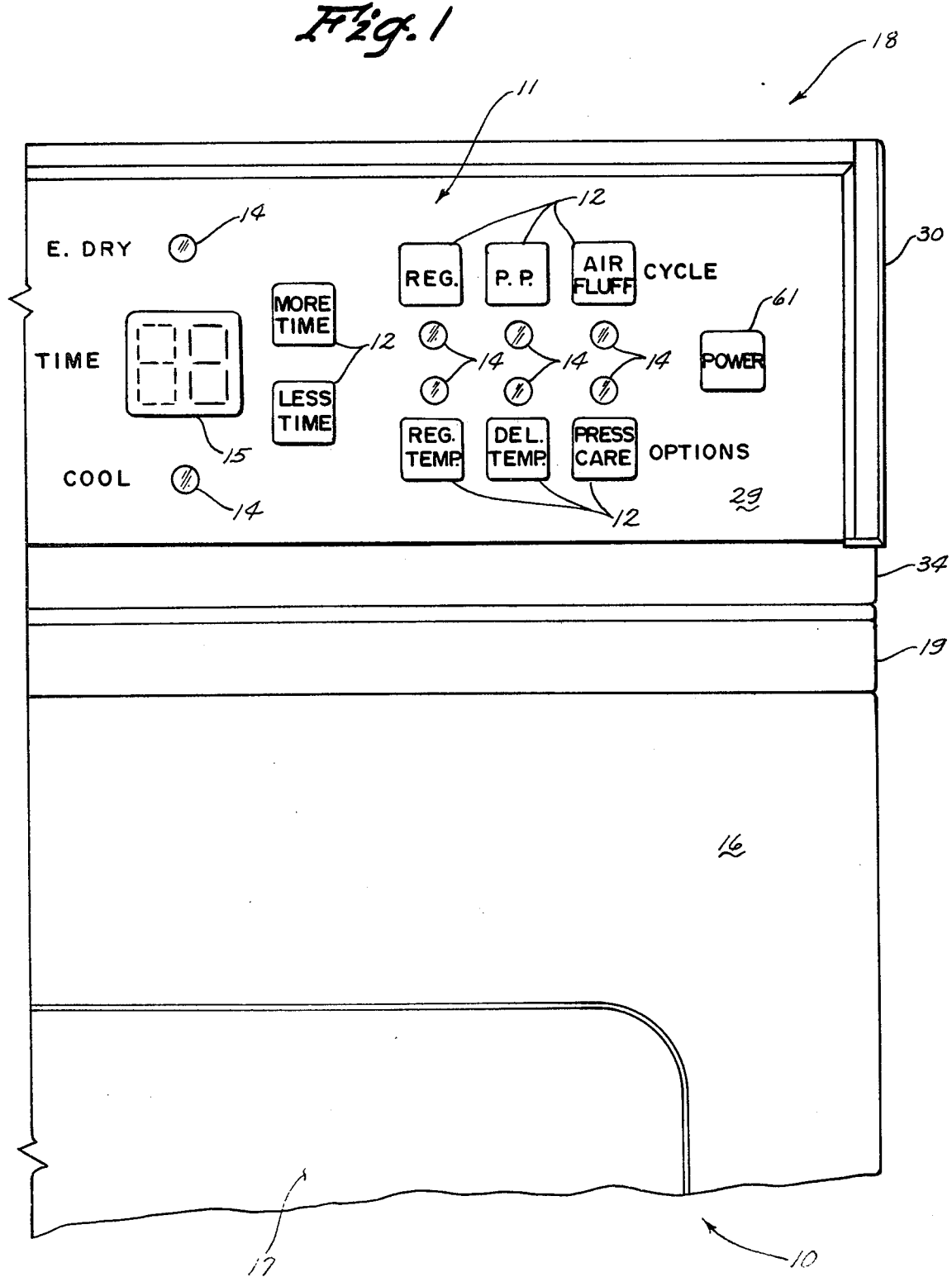
FIG. 1 is a fragmentary front elevation view of an appliance including a touch actuated control panel.

Referring now to the drawings and especially to FIG. 1 there is shown a fabric drying machine 10. This fabric drying machine 10 includes a touch control panel 11 having a plurality of touch pads 12 by which the operator can interface the fabric drying machine 10 with a microprocessor control as designated by numeral 13 in FIG. 2. When a touch pad 12 is depressed, a circuit is completed for producing a signal to the microprocessor 13. Thus, a drying cycle such as Permanent Press or Regular fabrics, indicated by "PP" and "Reg" in FIG. 1, can be selected as well as various cycle and time options. Also shown in FIG. 1 are a plurality of light emitting diodes (LED's) 14 adjacent the various touch pads 12 and a two digit seven segment display 15 for displaying either the time remaining in the cycle or an "E" for indicating that the electronic dry control is in operation. Two additional LED's 14 are utilized for indicating when the machine 10 is in Electronic Dry or in a Cool Down operation. A cabinet front panel 16 includes a hinged access door 17 for providing access to the interior of the fabric drying machine 10.

Figure 2:
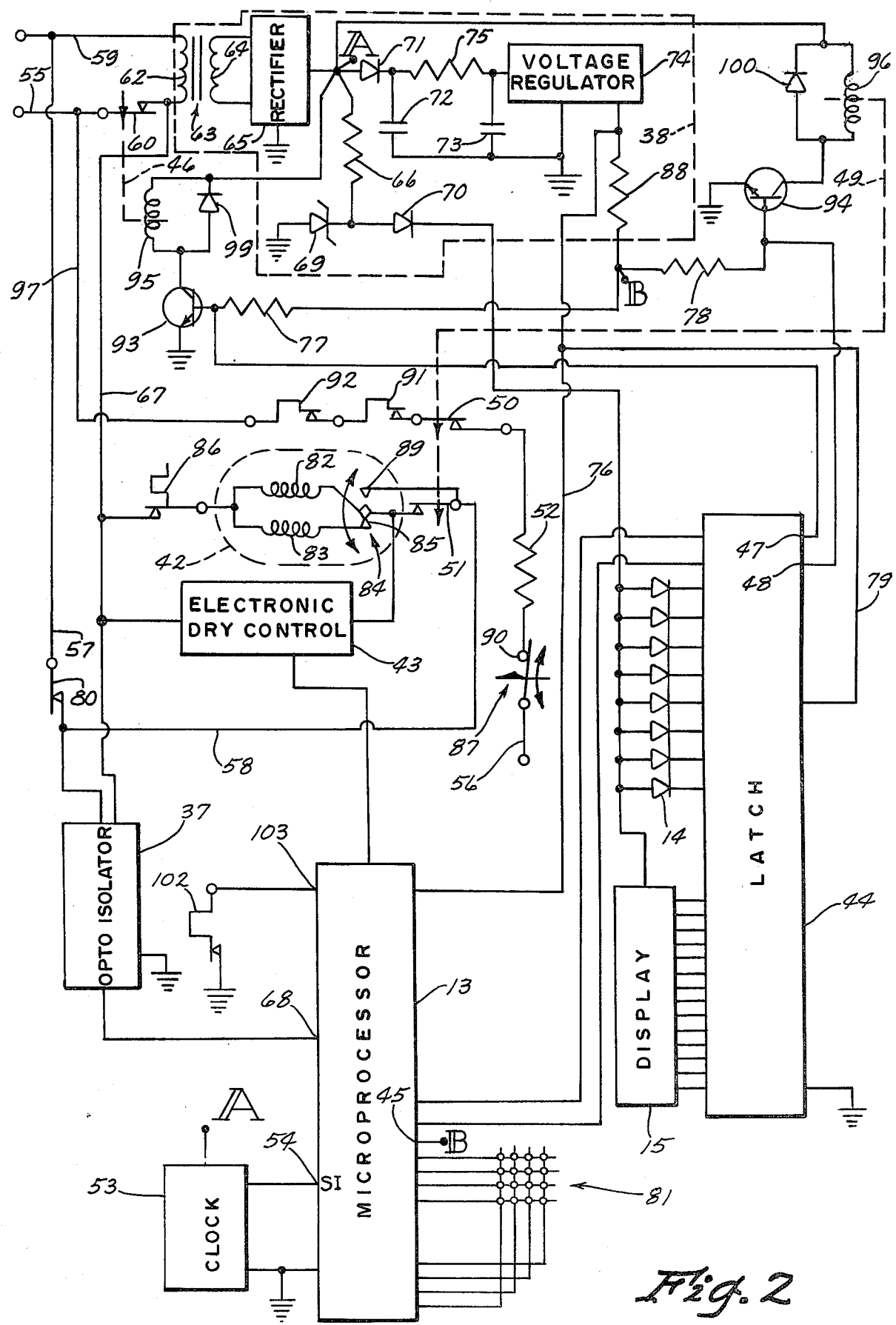
FIG. 2 is a schematic circuit diagram for the appliance.

The control circuit shown in FIG. 2 is composed of a plurality of electrical circuit portions. The circuit includes a power supply generally enclosed by broken line 38 and operable for supplying a plurality of voltages to operate various components. In this embodiment, a drive motor 42 is provided for rotating a fabric tumbler (not shown) and an electrical heating circuit is provided for heating the air used for drying fabrics within the fabric tumbler. An electronic dry control shown in block form at numeral 43 in FIG. 2 is operable in a well known manner for effecting termination of various fabric drying cycles by sensing the moisture content of the fabrics.

Further included in the control circuit of FIG. 2 and which will be further discussed herein is the National Semiconductor COPS 420/421 N-Channel microprocessor 13, a General Instruments MCT277 opto isolator 37, a National Semiconductor MM5450 latch 44, and the two digit seven segment display 15. The control circuit also includes an on/off relay 46 which is manually set and mechanically latched to power the drying machine 10 and is actuated by the microprocessor 13 through the latch 44 at the end of a cycle to release the latch and terminate operation of the drying machine 10. A motor/heater relay 49 is energized by the microprocessor 13 through the latch 44 when the drying machine 10 is powered to close a pair of switches 50 and 51 associated with the drive motor 42 and the heating element 52. In addition, a clock 53 produces a square wave input at the serial input (SI) port 54 having a frequency of 120 Hertz to provide a real time clock for the microprocessor 13.

The control circuit of FIG. 2 includes three power supply conductors 55, 56 and neutral 59 which are connectable with a conventional three-wire 240 volt, alternating current supply. For purposes of explanation of FIG. 2, it will be asssumed that the conductors 55 and 56 are connected with the power lines and that the neutral conductor 59 is connected to the earth grounded neutral line.

To energize the control circuit of FIG. 2 for controlling the fabric drying machine 10 as shown in FIG. 1, the switch 60 of the on/off relay 46 is manually set and mechanically latched by pressing the "Power" touch pad 61 shown in FIG. 1. Depressing the "Power" touch pad 61 will close the contacts of the switch 60 and supply 120 volts RMS to the primary winding 62 of the power supply transformer 63. The "Power" touch pad 61 shown herein could also be a mechanical switch member protruding through the membrane surface 29 and the instant invention is not to be limited to the touch pad construction shown.

The power supply transformer 63 develops 18 volts RMS across the secondary winding 64 creating a 25.5 volt peak alternating current potential at the input of the full wave bridge rectifier 65. The full wave bridge rectifier 65 then rectifies the secondary current to create a pulsating direct current supply.

At the output of the full wave bridge rectifier 65 a resistor 66 and a zener diode 69 are connected in series. The zener diode 69 clamps the wave form to 3.6 volts. A diode 70 provides a second voltage drop for reducing the voltage applied across the LED's 14 and the MM5450 latch 44 to approximately 2.9 volts maximum.

The diode 71 and the pair of capacitors 72 and 73 provide a filtered direct current supply as an input to the voltage regulator 74. The resistor 75 limits the voltage at the input to the voltage regulator 74. The output of the voltage regulator 74 provides a regulated 5 volts DC for powering the microprocessor 13 and the MM5450 latch 44 through conductors 76 and 79. It is noted that the power supply for the microprocessor 13 is independent of the circuit for the door switch 80 so that once the switch 60 has been mechanically latched in the closed position the microprocessor 13 is powered regardless of the condition of the door switch 80. Since the circuitry for the door switch is electrically isolated from the circuitry associated with the microprocessor 13, the access door 17 can be opened to interrupt operation of the drive motor 42 and heater 52 without losing power to the microprocessor 13. The access door 17 can then be closed and the interrupted cycle restarted by pushing that touch pad 12 associated with the interrupted cycle.

A further connection to the 25.5 volt peak output of the full wave bridge rectifier 65 is denoted by the stylized letter "A". A corresponding letter is shown in the lower left hand corner of FIG. 2. This connection provides power to the previously mentioned real time clock 53. The stylized letter "B" shown at the microprocessor 13 and also at the junction of the output of the voltage regulator 74 and the base of the transistors 93 and 94 is indicative of a circuit connection between these points.

Referring now to both FIGS. 1 and 2, the matrix of crossed lines indicated by the numeral 81 in FIG. 2 represents a 4×4 keyboard for the membrane switch included in the control panel 11. The touch pads 12 of FIG. 1 are associated with the switch and directly input information to the microprocessor 13 relative to cycles and cycle options. Each touch pad 12 shown on the membrane surface 29 in FIG. 1, except the "Power" touch pad 61, is connected across a row and column of the matrix 81 to input a specific digital code to the microprocessor 13. In addition to the eight touch pads 12 shown in FIG. 1, there may be other touch pads or switches for inputting additional information to the microprocessor 13 which are not shown on the partial touch control panel 11. The microprocessor 13 is programmed to output either a logic one or a logic zero signal to the various control components. For purposes of this application, a logic zero can be considered to be essentially a neutral circuit condition and a logic one can be considered to be the output potential of the voltage regulator 74.

The energizing circuit for the drive motor 42 of the fabric drying machine 10 operates on 120 volts AC available between the neutral conductor 59 and the conductor 55 through a circuit including conductor 57, door switch 80, conductor 58, motor/heater relay switch 51, centrifugal switch 84 made to a normally closed contact 85 within the drive motor 42, run and start windings 82 and 83, thermal protector 86, conductor 67, and manually operable switch 60.

Until the drive motor 42 rotates at a predetermined speed, the run and start windings 82 and 83 are both energized through the centrifugal switch 84 made to the normally closed contact 85, but upon operation of the centrifugal switch 84 to the normally open contact 89 the start winding 83 is disconnected from the circuit. After initial energization of the drive motor 42 and operation of the centrifugal switch 84 to the normally open contact 89, the circuit for energizing the drive motor 42 and maintaining energization thereof will extend from the neutral conductor 59, through conductor 57 and the door switch 80, through conductor 58, through the parallel combination of the normally open contact 89 of the centrifugal switch 84 and the motor/heater relay switch 51, through the run winding 82, through the thermal protector 86 and conductor 67, and through the manually operable switch 60 to conductor 55.

As further shown in FIG. 2, the heater circuit extends between power supply conductors 55 and 56 and operates on 240 volts AC. The heater circuit includes, in series connection, a second centrifugal switch 87 having a normally open contact 90 located physically within the drive motor 42, the electric heater 52, the motor/heater relay switch 50 which was closed when the fabric drying machine was first energized, a pair of thermostats 91 and 92 and conductor 97.

The pair of microprocessor controlled relays 46 and 49 are also powered by the 25.5 volt peak output of the full wave bridge rectifier 65. The motor/heater relay 49 is operable responsive to an output logic zero signal from the microprocessor 13 when the fabric drying machine 10 is energized for closing the pair of single-pole single-throw motor/heater relay switches 50 and 51 in series with the electric heater 52 and the drive motor 42, respectively. The on/off relay 46 is operable responsive to an output logic zero signal from the microprocessor 13 for effecting the opening of the switch 60 to terminate operation of the machine 10.

Transistors 93 and 94 provide an interface between the relays 46 and 49 and the latch 44 and are operable for energizing solenoids 95 and 96. When a logic zero signal is received from the microprocessor 13, during a cycle of operations, the latch 44 will produce a logic one signal at terminal 47 and 48 causing transistor 93 or 94 to conduct and effect energization of the relay solenoid 95 or 96. The diodes 99 and 100, in parallel with the relay solenoids 95 and 96 provide snubber paths around the relay solenoids 95 and 96 which allow the solenoid fields to collapse upon termination of operation without the appearance of voltage spikes on the collectors of the transistors 93 and 94.

The base leads of transistors 93 and 94 are connected to terminal 45 of the microprocessor 13 through resistor 77 and resistor 78, respectively, and are also connected to terminals 47 and 48 of the MM5450 latch 44. The dual connection of the transistors 93 and 94 with the microprocessor 13 and the latch 44 exist for initial energization purposes only. Once the appliance 10 has been powered by manually closing the normally open power-on switch 60, the voltage regulator 74 provides a 5 volt potential to both the microprocessor 13 and the MM5450 latch 44. The connection at terminal 45 insures that the transistors 93 and 94 are held in an off condition until the microprocessor 13 can initialize the condition of terminals 47 and 48 of the MM5450 latch 44 to a logic zero. Once this is accomplished terminal 45 of the microprocessor 13 is configured as a logic one. Upon initial energization, it is the characteristic of the microprocessor 13 to cause terminal 45 to become a logic zero. It is further the characteristic of the MM5450 latch 44 upon initial energization to cause terminals 47 and 48 to be a logic one. Shortly after initial energization under program control, the microprocessor 13 programs the MM5450 latch 44 in such a manner that terminals 47 and 48 also become a logic zero. This condition is required during normal operation of the appliance 10. If the junction between resistors 77 and 78 and resistors 78 and 88 were not connected to the logic zero terminal 45 of the microprocessor 13, initial energization of the 5 volt output of the voltage regulator 74 would cause the transistors 93 and 94 to conduct by providing base current equivalent to a logic one condition through the resistors 77 and 78 respectively. This transient circuit condition would attempt to cause the relay solenoid 95 to unlatch or reset the normally open switch 60 being held in the closed position to power the appliance 10. This transient circuit condition would also attempt to energize solenoid 96 to close the first and second relay switches 50 and 51.

Generally, the operation of the fabric drying machine 10 proceeds as follows: the microprocessor 13 is powered up by depressing the "Power" touch pad 61. This action will manually close and mechanically latch the switch 60 and connect the power supply transformer 63 across the 120 volt RMS power source through conductor 55 and neutral 59 and thereby provide a stepdown voltage to the full wave bridge rectifier 65. The output of the full wave bridge rectifier 65 feeds the voltage regulator 75 to provide a regulated voltage for the microprocessor 13 and the MM5450 latch 44. The output of the full wave bridge 65 also provides power for energizing the relay solenoids 95 and 96, the LED's 14 and the real time clock 53.

Once the microprocessor 13 has been energized by the closing of switch 60, a cycle of operations such as Permanent Press has been chosen, and the access door 17 has been closed to close the door switch 80, the microprocessor 13 will output signals for controlling various components in a sequence to achieve the selected cycle. More specifically, a logic zero signal will be output to turn on transistor 94 for energizing the solenoid 96 to close the motor/heater switches 50 and 51. Once the motor/heater relay switch 51 in series with the drive motor 42 has been closed, the drive motor 42 will be started. When the drive motor 42 has achieved run speed, the pair of internal centrifugal switches 84 and 87 will each be operated to allow the motor run winding 82 to operate alone and allow the heater 52 to be energized between conductors 55 and 56.

As further shown in FIG. 2, once the first centrifugal switch 84 moves to the normally open contact 89 a circuit is formed around the closed motor/heater relay switch 51. Thus, once the drive motor 42 is started, the motor/heater relay 49 remains in the circuit only for controlling the heater 52 through the microprocessor 13 and the electronic dry control 43. It is noted that the motor/heater relay 49 is required for starting the drive motor 42 but is not required for stopping the drive motor 42.

The opto isolator 37 is provided between the door switch 80 and terminal 68 of the microprocessor 13. The microprocessor 13 continually monitors the condition of the door switch 80 through the opto isolator 37. If the door switch 80 is found to be open, the microprocessor 13 will output a signal through the latch 14 to deenergize the relay 49. Deenergizing the relay 49 will open relay switch 51 and prevent the drive motor 42 from being reenergized upon closing the access door 17. It is thus necessary to also reclose the appropriate cycle selection switch in a push-to-start manner after reclosing the access door 17 before the drive motor 42 will be restarted. Reference is made to a copending application entitled "Interruptable Cycle for Microprocessor Controlled Appliance" filed on an even date with this application by Curran D. Cotton and assigned to the assignee of the instant invention.

If, for example, an Air Fluff cycle has been selected, two seconds after selection of that cycle the microprocessor 13 will cause the motor/heater relay 49 to become deenergized. Deenergizing this relay causes the motor/heater relay switches 50 and 51 to open. Opening the motor/heater relay switch 51 will not disconnect the drive motor 42 from the 120 volt AC line since the run winding 82 remains connected to the 120 volt AC line through contact 89 of the centrifugal switch 84. Opening the motor/heater relay switch 50 does, however, remove the heater 52 from an operating condition. Thus, in any cycle, including an Air Fluff cycle, energization of the heater 52 will take place for two seconds at the beginning of the cycle under software control to effect starting of the motor 42. Deenergization of the drive motor 42 is accomplished under control of the microprocessor 13 by the energization of the on/off relay 46. Energizing the on/off relay 46 though transistor 93 causes the switch 60 to open breaking power to the power supply transformer 63 and the 120 volt service to the drive motor 42 and one side of the heater 52.

As further shown in FIG. 2, the 140° F. control thermostat 102 of this embodiment is not directly connected in the heater circuitry but is connected to input port 103 of the microprocessor 13. Operation of this thermostat 102 is called for by the Delicate Temperature cycle option, indicated by "Del. Temp" in FIG. 1, under software control and causes input port 103 to be either at a logic zero condition when the thermostat 102 connects port 103 to the circuit common or a logic one condition when the thermostat 102 is in an open condition. Although this embodiment of the invention utilizes a 140° F. thermostat, the invention is not to be limited solely to that thermostat. During the Delicate Temperature cycle option the condition of the 140° F. thermostat 102 is monitored by the microprocessor 13. When the microprocessor 13 determines that the 140° F. thermostat 102 is open, and is programmed for that to be the limiting temperature for the particular clothes load, the microprocessor 13 causes the motor/heater relay 49 to be deenergized through the latch 44 and, as explained previously, removes the parallel connection to the drive motor 42 by opening the motor/heater switch 51. The main power to the heater circuit is interrupted by opening the motor/heater switch 50. Thus, the heater 52 is deenergized without the 140° F. thermostat 102 being directly in the heater circuitry. When the 140° F. thermostat 102 again closes, the microprocessor 13 senses same and reenergizes the motor/heater relay 49 causing the motor/heater switches 50 and 51 to again close for a reestablishing power to the heater 52. As previously noted, during this deenergization of the motor/heater relay 49, the operational condition of the drive motor 42 was unaffected and only the heater 52 was deenergized. Thus it can be seen that by utilizing one motor/heater relay 49 in combination with the centrifugal switch 84 separate control of both the drive motor 42 and the heater 52 can be maintained.

Therefore, the instant invention provides a control for a microprocessor-based fabric drying appliance where a single relay operates a pair of single-pole single-throw switches in cooperation with the centrifugal switches of the drive motor. In the fabric drying appliance disclosed herein, the pair of switches control the heater and the drive motor. The microprocessor is also operable in at least one cycle of operations for controlling the motor/heater relay responsive to a signal from a temperature sensing element such as a thermostat.

In the drawings and specification, there has been set forth a preferred embodiment of the invention and although specific terms are employed these are used in a generic and descriptive sense only and not for purposes of limitation. Changes in form and the proportion of parts as well as the substitution of equivalents is contemplated as circumstances may suggest or render expedient without departing from the spirit or scope of the invention as further defined in the following claims.

I claim:

1. A microprocessor-based control for a fabric drying apparatus having structure including a rotatable fabric tumbler, a drive motor for driving the rotatable fabric tumbler, and means for heating to effect drying in said tumbler, the combination comprising: control means including a microprocessor for controlling operation of said fabric drying apparatus; first circuit means for controlling said drive motor including a first relay switch and a centrifugal switch, said first circuit means being operable for initiating energization of said drive motor in a first posture of said centrifugal switch and for maintaining energization of said drive motor in a second posture thereof independent of said first relay switch; second circuit means for energizing said means for heating including a second relay switch; and interfacing circuitry for electrically interfacing said microprocessor with said drive motor and said means for heating including a single relay coil for generally concurrently operating said first and second relay switches under control of said microprocessor, said first circuit means further including means for maintaining energization of the drive motor during periods of deenergization of said single relay coil whereby said microprocessor is operable for controlling the operation of said means for heating without interrupting operation of the drive motor.

2. A microprocessor-based control for a fabric drying apparatus having structure including a rotatable fabric tumbler, a drive motor for driving the rotatable fabric tumbler, and means for heating to effect drying in said tumbler, the combination comprising: control means including a microprocessor for controlling operation of said fabric drying apparatus; first circuit means for energizing said drive motor including a first relay switch in series with a centrifugal switch of said drive motor, said centrifugal switch having normally closed contacts for initiating energization of said drive motor and normally open contacts operable to a closed condition on rotation of said drive motor for maintaining energization thereof independent of said first relay switch; second circuit means for energizing said means for heating including a second relay switch; and interfacing circuitry for electrically interfacing said microprocessor with said drive motor and said means for heating including a single relay coil for generally concurrently operating said first and second relay switches under control of said microprocessor, said first circuit means further including means for maintaining energization of the drive motor during periods of deenergization of said single relay coil, whereby said microprocessor is operable for controlling the operation of said means for heating without interrupting operation of the drive motor.

3. A microprocessor-based control as defined in claim 2 wherein said control means further includes temperature sensing means electrically isolated from said means for heating and associated with said microprocessor, said microprocessor being operable for deenergizing said relay coil to open said first and second relay switches upon said temperature sensing means sensing a predetermined temperature.

4. A microprocessor-based control as defined in claim 2 wherein said first circuit means includes a conductor in series with said normally open contacts and in parallel with said first relay switch for maintaining energization of the drive motor during periods of deenergization of said means for heating.

5. A microprocessor-based control for a fabric drying apparatus having structure including a rotatable fabric tumbler, a drive motor for driving the rotatable fabric tumbler, and means for heating to effect drying in said tumbler, the combination comprising: control means including a microprocessor for controlling operation of said fabric drying apparatus; first circuit means for energizing said drive motor including a first relay switch in series with a centrifugal switch of said drive motor, said centrifugal switch having normally closed contacts for initiating energization of said drive motor and normally open contacts operable to a closed condition upon rotation of said drive motor for maintaining energization thereof independent of said first relay switch; second circuit means for energizing said means for heating including a second relay switch; interfacing circuitry for electrically interfacing said microprocessor with said drive motor and said means for heating including a single relay coil for generally concurrently operating said first and second relay switches under control of said microprocessor, said first circuit means further including means for maintaining energization of the drive motor during periods of deenergization of said single relay coil; and temperature sensing means electrically isolated from said means for heating and associated with said microprocessor, said microprocessor operable for energizing or deenergizing said single relay coil for closing or opening said first and second relay switches upon said temperature sensing means sensing predetermined temperatures whereby said means for heating is energized or deenergized independently of said drive motor.

6. A microprocessor-based control as defined in claim 5 and further including switch means associated with an access door of said structure and operable upon opening of said access door for interrupting energization of said drive motor and said means for heating without deenergizing said microprocessor.

7. A microprocessor-based control as defined in claim 6 and further including push-to-start switch means associated with said microprocessor and operable for reenergizing said drive motor and said means for heating after reclosing said access door.

8. A microprocessor-based control for a fabric drying apparatus having structure including a rotatable fabric tumbler, a drive motor for driving the rotatable fabric tumbler, and means for heating to effect drying in said fabric tumbler, the combination comprising: control means including a microprocessor for controlling operation of said fabric drying apparatus; first circuit means for energizing said drive motor including a first relay switch in series with a centrifugal switch of said drive motor, said centrifugal switch having normally closed contacts for initiating energization of said drive motor and normally open contacts operable to a closed condition upon rotation of said drive motor for maintaining energization thereof independent of said first relay switch; second circuit means for energizing said means for heating including a second relay switch; interfacing circuitry for electrically interfacing said microprocessor with said drive motor and said means for heating including a single relay coil for generally concurrently operating said first and second relay switches under control of said microprocessor, said first circuit means further including means for maintaining energization of the drive motor during periods of deenergization of said single relay coil, switch means associated with an access door of said structure and operable upon opening of said access door for interrupting energization of said drive motor and said means for heating without deenergizing said microprocessor; and push-to-start switch means associated with said microprocessor and actuatable for reenergizing said drive motor and said means for heating after reclosing said access door.

9. A microprocessor-based control as defined in claim 8 wherein said control means further includes a thermostat electrically isolated from said means for heating and associated with said microprocessor, said thermostat actuatable at a predetermined temperature and said microprocessor operable for deenergizing said first and second relay switches upon sensing said predetermined temperature.

10. A microprocessor-based control for a fabric drying apparatus having structure including a rotatable fabric tumbler, a drive motor for driving the rotatable fabric tumbler and means for heating to effect drying in said fabric tumbler, the combination comprising: control means including a microprocessor for controlling operation of said fabric drying apparatus; first circuit means for energizing said drive motor including a first relay in series with a centrifugal switch of said drive motor, said centrifugal switch having normally closed contacts for initiating said energization of said drive motor and normally open contacts operable to a closed condition upon rotation of said drive motor for maintaining energization thereof independently of said first relay switch; second circuit means for energizing said means for heating including a second relay switch; interfacing circuitry for electrically interfacing said microprocessor with said drive motor and said means for heating including a single relay coil for generally concurrently operating said first and second relay switches under control of said microprocessor, said first circuit means further including a conductor in series with said normally open contacts and in parallel with said first relay switch for maintaining said drive motor energized during deenergization of said means for heating; a thermostat electrically isolated from said means for heating and associated with said microprocessor, said thermostat actuatable at a predetermined temperature and said microprocessor operable for deenergizing said first and second relay switches responsive to said thermostat sensing said predetermined temperature; switch means associated with an access door of said structure and operable upon opening of said access door for interrupting energization of said drive motor and said means for heating without deenergizing said microprocessor; and push-to-start switch means associated with said microprocessor and actuatable for reenergizing said drive motor and said means for heating after closing said access door.

* * * * *